Figure 1:
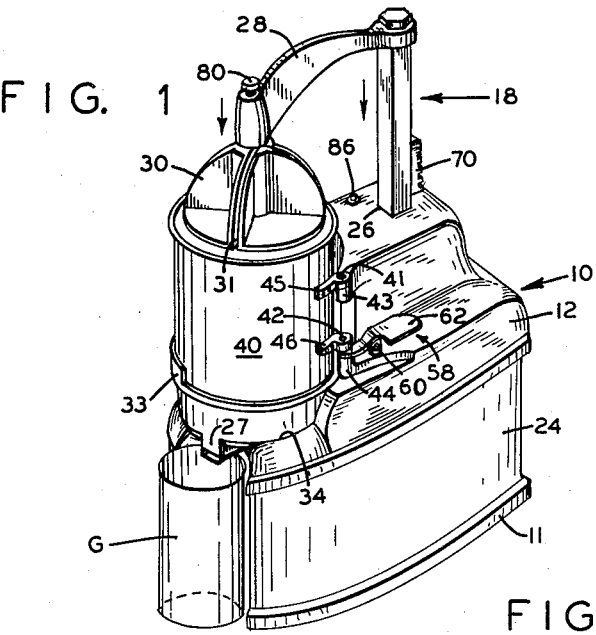

Oct. 29, 1963　　　R. C. READ ETAL　　　3,108,533
JUICE EXPRESSING MACHINE
Filed Oct. 16, 1961　　　　　　　　　　　　4 Sheets-Sheet 1

INVENTORS.
ROBERT C. READ
FRANK J. GREGOR
BY John P. Chandler
THEIR ATTORNEY.

Oct. 29, 1963 R. C. READ ETAL 3,108,533
JUICE EXPRESSING MACHINE
Filed Oct. 16, 1961 4 Sheets-Sheet 2

*INVENTORS.*
ROBERT C. READ
FRANK J. GREGOR
BY John P. Chandler
THEIR ATTORNEY.

INVENTORS.
ROBERT C. READ
FRANK J. GREGOR

BY *John P. Chandler*

THEIR ATTORNEY.

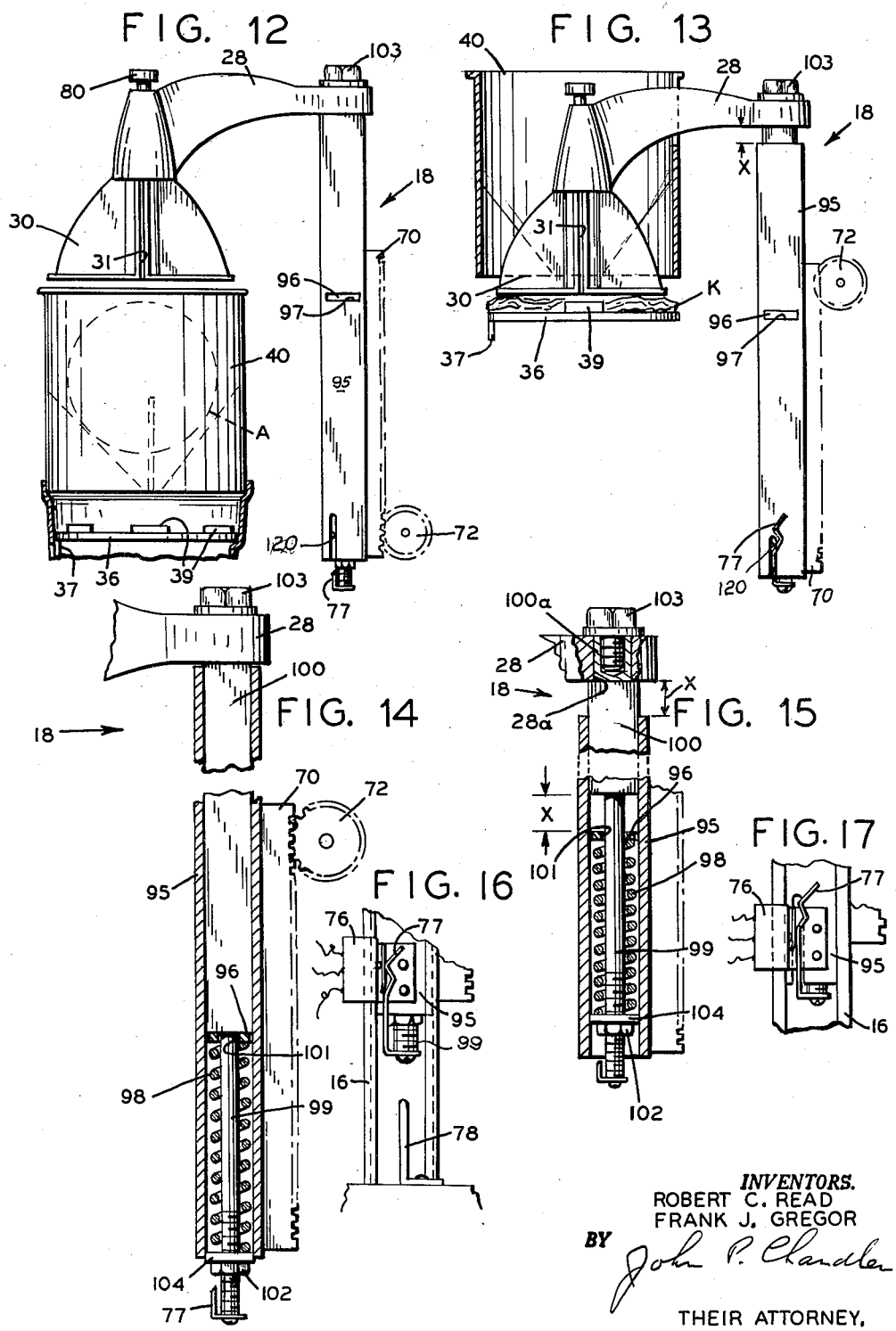

United States Patent Office 3,108,533
Patented Oct. 29, 1963

3,108,533
JUICE EXPRESSING MACHINE
Robert C. Read, Wilton, Conn., and Frank J. Gregor, Freeport, Long Island, N.Y., assignors to The Gordon Company, Norwalk, Conn.
Filed Oct. 16, 1961, Ser. No. 145,329
2 Claims. (Cl. 100—98)

This invention relates to improvements in fruit juice extracting machines and more particularly to motor driven machines for expressing juice from citrus fruits.

The machine of the present invention operates upon a single article of fruit such as an orange or lemon and is adapted primarily for home use of for use at a soda fountain.

Devices of this type which are currently being used have certain shortcomings such as the necessity to cut the fruit before inserting it in the machine, or if the machine cuts the fruit, it is accomplished by a separate operation which entails directing the fruit out to the cutter and then back to the extractor, thus requiring elaborate and expensive mechanism. Furthermore, some varieties of machines macerate the skin and disperse it, thus impairing flavor of the juice. In addition machines which express the juice from the fruit are so constructed that the fruit is pressed and immediately released before the juice has run off, with the result that a portion of the juice is reabsorbed by the pulp and thus lost.

An important object of the present invention, is to provide a motor driven juice expressing machine which cuts the fruit and expresses the juice in a single operation and which accommodates fruit having varying thickness of skins.

Another object of the present invention is to provide a motor driven juice expressing machine incorporating a time delay device therein to retain the fruit in pressed condition while the juice is allowed to run off.

A further object of the invention is to provide a motor driven juice extractor so designed as to include safety features such as insurance against the accidental starting of the motor while it is being loaded.

Another object of the present invention is the provision of a motor driven juice extractor which is characterized by its extreme simplicity and reliability, thus lending itself to everyday household use and wherein the entire cycle of operation is performed automatically following the momentary closing of a circuit by depressing a push button switch.

Still another object is the provision of a completely automatic device excepting for the loading and unloading operations.

An important feature of the invention resides in the provision of a juice expressing machine having a juice collecting tray provided with a delivery opening and an inclined path leading to the opening. A perforated platen or false bottom spaced from said tray serves as a pressure plate or work support against which the fruit is squeezed. Holes in the platen allow the juice to pass and strain out the solid material. A fruit receiver mounted above the juice collecting tray is eccentrically pivoted for movement away from the collecting tray to allow for removal of the fruit carcass from the tray and for loading fruit into the receiver preparatory to squeezing. The fruit receiver is a cylindrical open ended member and is provided with a plurality of knives mounted upon the lower portion of the inner wall and which project radially inwardly. The fruit is placed in the receiver supported upon the knives, and the receiver with the fruit is swung into operating position. A presser plate mounted for reciprocating motion upon an arm passes through the receiver, pushing the fruit before it, through the cutting knives and pressing it against the perforated work support. The presser plate is provided with slots through which the knives may pass, allowing this presser plate to pass below the knives. A time delay device holds the presser plate in lowermost squeezed position, against the work support, for a sufficient time to allow substantially all of the juice to run off. The presser plate is then returned upwardly to loading position above the fruit receiver.

Figure 7:
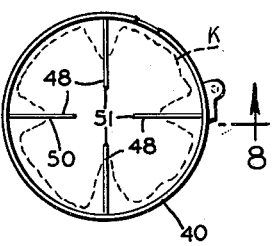
Figure 2:
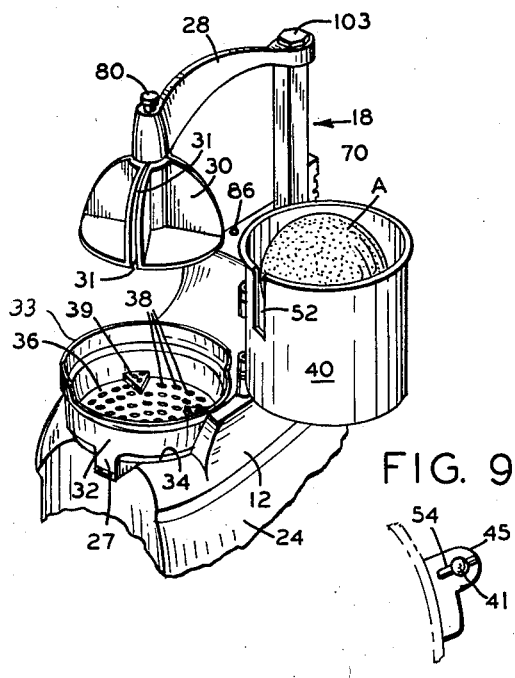
Figure 9:
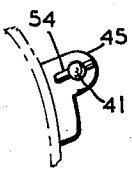
Figure 8:
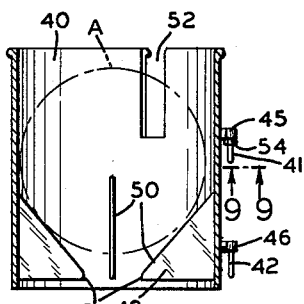
Figure 3:
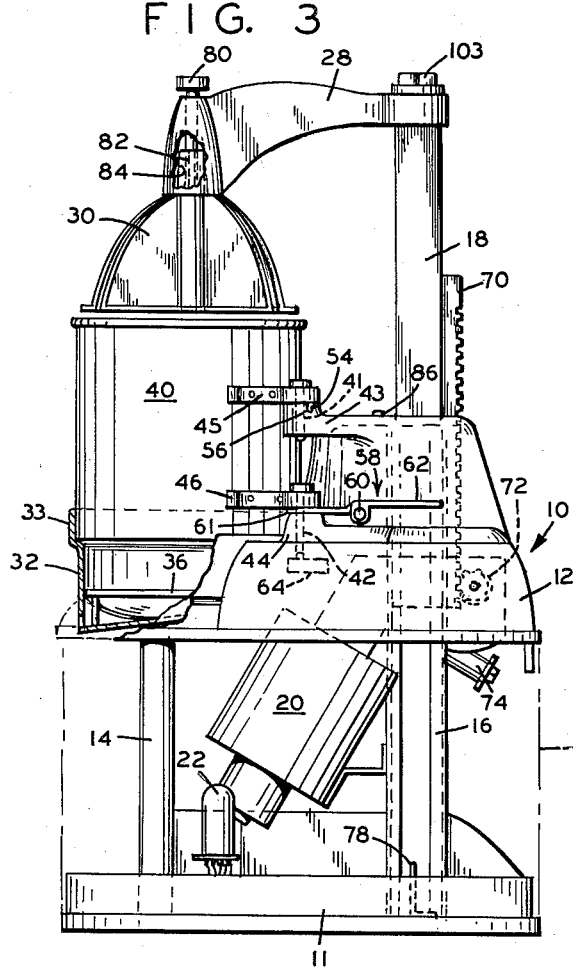
Figure 4:
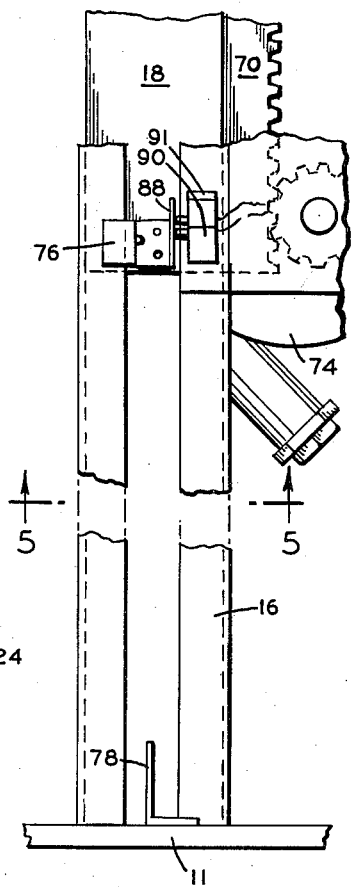
Figure 5:
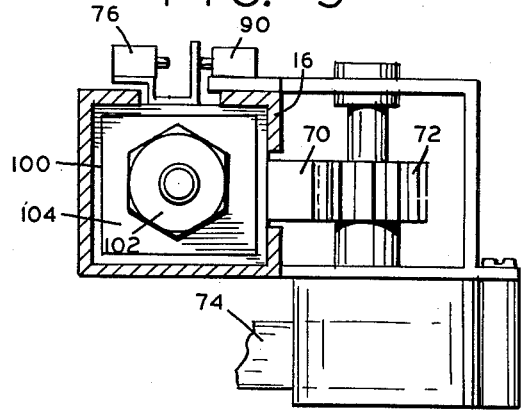
Figure 6:
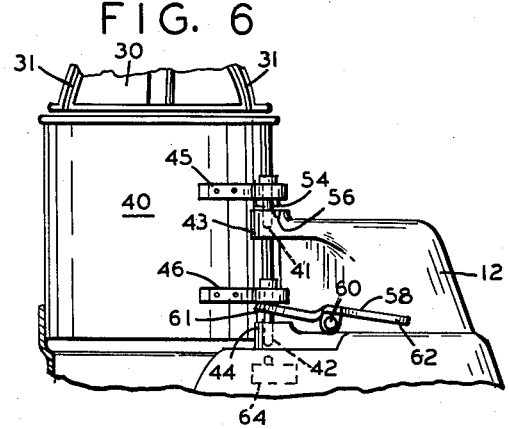
Figure 10:
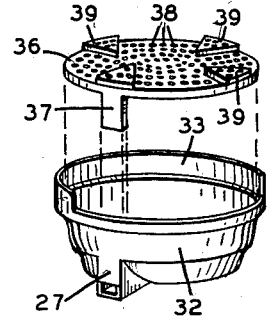
Figure 11:
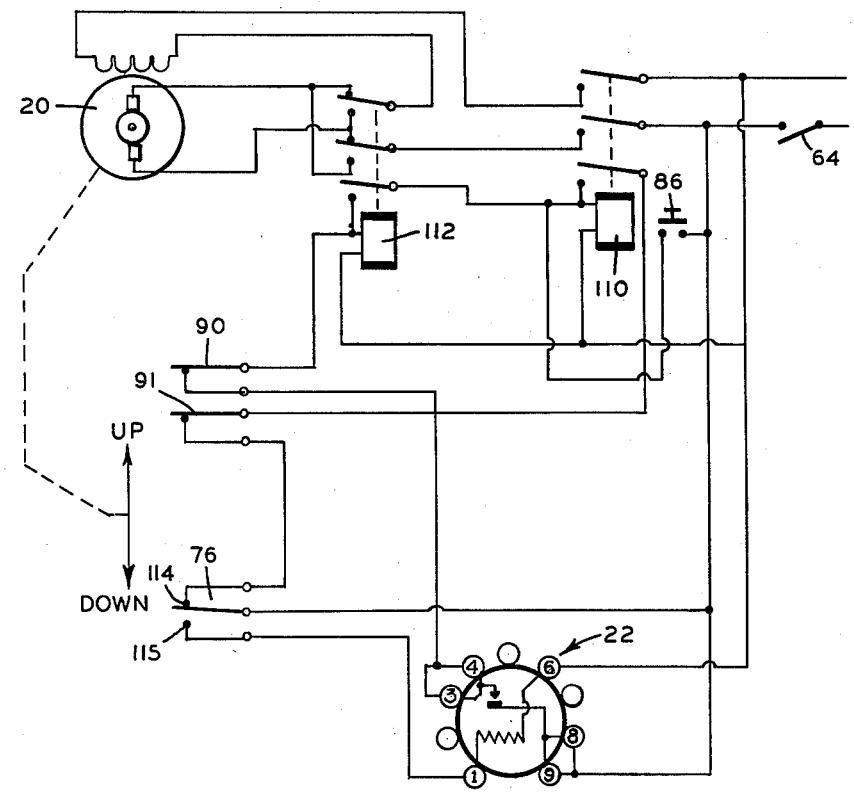

In the drawings:
FIG. 1 is a perspective view of the apparatus.
FIG. 2 is a similar perspective to FIG. 1 but showing the fruit receiver in loading position.
FIG. 3 is a slide elevation of the machine with the motor compartment cover removed to show the driving mechanism.
FIG. 4 is an enlarged view of the reciprocable arm assembly and the guides therefor.
FIG. 5 is a view along line 5—5 of FIG. 4.
FIG. 6 is a broken side elevation showing movement of the receiver.
FIG. 7 is a plan view of the fruit receiver.
FIG. 8 is a sectional elevation taken along line 8—8 of FIG. 7.
FIG. 9 is a view taken along line 9—9 of FIG. 8.
FIG. 10 is an exploded perspective of the juice receiving tray.
FIG. 11 is a schematic of the electrical components.
FIG. 12 is a side elevation view of the squeezer and drive arm, in normal position.
FIG. 13 is a view similar to FIG. 12 showing the lowermost position of the squeezing arm.
FIG. 14 is a sectional view of the arm detail.
FIG. 15 is a sectional view similar to FIG. 14 showing the arm detail in lowermost position.
FIG. 16 is a broken side elevation of the lower end of the support for the arm assembly.
FIG. 17 is a similar view showing the parts in a different position.

Referring now to FIGS. 1, 2 and 3, the machine is constructed with a frame generally indicated 10 including a bottom section and a top section 12 spaced apart from the bottom by two posts 14 and a guide 16 which also contains a reciprocable arm assembly generally indicated 18. There is an electric motor 20 together with the electrical circuitry including a time delay switch 22 contained within the frame, all of which is enclosed by a sheet metal wrap 24 around the side wall. The reciprocable arm assembly 18 extends upwardly from the guide 16 through an opening 26 in the frame top 12. An arm 28 is keyed to the free end of the connecting rod 100, in the assembly 18 to support a presser plate 30 in normally spaced apart relation above a juice collecting tray 32 with a juice delivery spout 27, which is nested in a seat 34 of mating dished contour in the frame top 12. There is a perforated work support or platen 36 which is inserted within the tray 32 which supports the fruit during the squeezing operation. The platen is provided with a plurality of holes 38 to strain the pulp and seeds from the fruit juice. There are, also four filler blocks 39 projecting above the top surface of the platen 36, the filler blocks being integral with the platen and having the same pattern of openings 38 as in the platen. These blocks are located in spaced relation adjacent the outer edge of the platen, and centered below the knives 48. Tab 37 on platen 36 (FIG. 10) is accommodated in juice delivery spout 27, assuring the proper positioning of filler blocks 39 under knives 48.

A cylindrical open-ended fruit receiver 40 is pivotally mounted by pins 41 and 42 which are received in two bosses 43 and 44 in the frame top 12. The pins 41 and 42 are secured to brackets 45 and 46 respectively which are attached to the outside of the fruit receiver 40. This arrangement permits the receiver to be swung outwardly from its normal operating position, between the presser plate 30 and the juice tray 32, into loading position as best shown in FIG. 2. There are four knives 48 radially disposed which are attached 90° apart around the inner wall of the receiver 40 at its lower end. These knives are generally triangular in shape and have cutting edges 50 along the top edges thereof which incline downwardly and inwardly from the axis or center of the receiver in order to permit passage of plate 30.

A slot 52 is provided in the upper end of the fruit receiver wall to allow clearance for movement of the arm 28 as it carries the presser plate 30 downwardly into the receiver. The presser plate 30 is furthermore provided with four slots 31 so aligned as to permit it to pass below knives 48.

The fruit receiver 40 is locked in operating position by a key 54 depending from the bracket 45 which is received in a mating slot 56 in the upper boss 43, FIG. 3. This insures alignment of the slots 31 in the plate 30 with the knives 48 and it also insures alignment of the slot 52 with the arm 28. Also, it insures that pin 42 cannot drop down to close the safety switch circuit until these elements are aligned.

It will now become apparent that when it is desired to swing the receiver 40 outwardly into loading position, the key 54 must be raised out of the mating slot 56 in order to allow the receiver to rotate on the pins 41 and 42. This is accomplished by a lever 58 which is pivoted on the frame 12 at 60 as clearly shown in FIG. 6. One end 61 of the lever 58 extends beneath the bracket 46 and rests upon the boss 44. The free end of the lever forms a tab or finger piece 62 which is pressed by the operator to raise the receiver 40 sufficiently for the key 54 to clear the mating slot 56, as shown in FIG. 6, thus permitting the receiver to be moved into loading position, FIG. 2. It will be noted in FIG. 6 that the pin 42 extends beneath the top frame 12 to operate a microswitch 64. When the receiver is in locked operating position the pin 42 retains the microswitch 64 closed. When, however, the lower pin 42 is raised by virtue of the lever 58, the microswitch 64 opens and prevents the machine from being operated while it is being loaded. The upper arcuate edge of the juice collecting tray 32 is provided with a raised lip 33, on the side opposite the loading side, against which the receiver 40 stops when moved from loading position into operating position. This is an additional safety feature to positively stop the receiver in loading position, in which postion key 54 will again drop into mating slot 56, closing safety microswitch 64.

The reciprocable assembly 18 carries on sleeve 95 (FIGS. 12 to 15) a rack 70 which is driven by the motor 20 through a pinion 72 and a gear reduction device 74 as shown in FIGS. 3 and 4. Another microswitch 76 is carried at the lower end of sleeve 95 of assembly 18 and is operated by an actuating finger 77 attached to the reduced lower end section 99 of connecting rod 100 (FIGS. 14 and 15) and, if the squeezer is operated "unloaded," finger 77 is operated by safety prong 78 secured to the base 11. The presser plate 30 is removably attached to the bracket 28 by a thumb screw 80 (FIG. 2) which is received in a threaded hole in the upper end 82 of the presser plate 30. The end 82 is square and is received in a square opening 84 in the bracket 28 to position the plate 30 in proper alignment with knives 48. As earlier mentioned, a reciprocable arm assembly 18 is constructed with a square outer sleeve 95 which carries the rack 70 on its rear outer wall. A transverse plate 96 is secured in slots 97 in opposite walls of sleeve 95 and projects across the tube opening at a point within the tube 95 spaced from the lower end sufficiently to accommodate a compression spring 98 therein. The spring surrounds the reduced lower end 99 of the square connection rod 100 which is received within the upper end of the square sleeve 95. The lower end 99 of the connecting rod 100 projects through a hole 101 in the plate 96. The extreme lower end of rod 99 is threaded to receive a nut 102 which retains a square washer 104 in contact with the spring 98 which is held thereby under approximately 200 pounds pressure. This has been determined as being substantially the best pressure under which the most suitable and efficient juice extraction results are obtained. The connecting rod 100 is furthermore constructed with a reduced square upper end 100a which mates in a square opening 28a to key the arm 28 in proper position. A headed screw 103 serves to affix the arm 28 upon the connecting rod 100. By this arrangement it will be seen that if the orange has a particularly thick skin, the pressure plate 30 and connecting rod 100 will not travel downwardly as far as it will for a thin-skinned orange, although the same pressure of approximately 200 pounds is exerted on each.

In operation, the finger piece 62 is manually depressed, thus raising the receiver 40 and pin 42 and consequently releasing the microswitch 64 (FIG. 6) and thereby opening the circuit to prevent any accidental starting of the motor during the loading operation. The receiver 40 is moved outwardly into loading position as best illustrated in FIG. 2. A whole fruit, A, such as an orange, is placed within the receiver where it centers itself upon the knives 48. The receiver is then moved back into operating position (FIG. 1) and pin 42 closes the microswitch 64. The button on the starting switch 86 is then momentarily pressed, energizing a relay 110 causing the motor 20 to start, driving the assembly 18 downwardly through operation of the gear reduction 74, pinion 72 and rack 70 and closing the switches 90 and 91. These switches electrically lock in the relay 110 through the contact 114 of the switch 76. As the assembly 18 moves downwardly, it carries the presser plate 30 which pushes the orange A, which was placed within the receiver, past the knives 48 slotting its sides in four places and then pressing it against the platen 36 to express the juice. The four filler blocks 39, on the platen 36, by filling in the slit gaps in the "carcass," serve to increase the efficiency of the operation. Without the filler blocks a comparatively large amount of the juice incorporated in the pulp would remain in these gap areas of the skin as shown in FIGURE 7 but by providing the raised areas or blocks the juice must pass into the juice collecting tray 32. As the assembly 18 completes the squeezing operation the finger 77 operates the microswitch 76 to open the contact 114 and close the contact 115. If operated "unloaded," safety prong 78 acts on finger 77 at a lower point. It will be noted that sleeve 95 is slotted at 120 to receive finger 77.

As a result of opening the contact 114 the relay 110 is de-energized and the motor stopped. The time delay switch 22 is energized by the closing of the contact 115. After a predetermined two second pause, which is initiated for the purpose of allowing the juice to run from the squeezed orange, the contacts of the thermal delay switch 22 closes to energize the relays 110 and 112. The operation of the relay 112 reverses the motor leads and consequently reverses the direction of rotation of the motor 20 to raise the assembly arm 18 into its normal starting position. As the reversed motor raises sleeve 95 of assembly 18, the compression on spring 98 is relieved, dropping finger 77, allowing microswitch 76 to open contact 115. This allows thermal time delay switch 22 to cool off and re-open its contacts and close contact 114, which effects a holding circuit for the relays 110 and 112.

As the assembly 18 approaches its upper limit a finger 88 carried on the lower end of the assembly 18 operates the switch 91 to open the circuits to the relays 110 and 112 thus de-energizing them and stopping the motor 20. The switch 90 is also opened to insure the positive opening of the circuit of the delay switch 22, in the event of insufficient cooling and closing time due to the possible restriction of the travel of the assembly 18. The tab 62 is then manually pressed and the receiver 40 swung into loading position (FIG. 2) permitting the fruit carcass to be removed from the platen and another fruit placed in the receiver 40, ready for a repeat cycle.

It will become apparent that, when in loading position, he receiver 40 can be quickly removed from the machine for cleaning by lifting it upwardly, withdrawing the pins 41 and 42 from the bosses 43 and 44 respectively. Also the juice tray 32 together with the platen 36 can readily be lifted out of its seat for cleaning. Additionally, the presser plate 30 can be easily removed for cleaning by removing the screw 80.

Inasmuch as the diameter of oranges or other fruit varies over a wide range, the present invention includes a degree of flexibility of the presser plate 30 to accommodate this variation in size.

With particular reference to FIGS. 12 through 15 the presser plate 30 is shown in normal position in FIG. 12 with a fruit, A, loaded in the receiver 40 ready to go through an expressing cycle. The assembly 18 is driven downwardly by means of the rack 70 and pinion 72 as described above and carries the plate 30 into its lowermost position as illustrated in FIG. 13. In the event that the fruit carcass, K, is large, causing the plate 30 to stop before reaching its lowermost possible position, the connecting rod 100 also stops inasmuch as the presser plate 30 is secured through the arm 28 to the connecting rod 100. The rack 70 and pinion 72, however, continue to drive causing the outer sleeve 95 of assembly 18 to slide along the connecting rod 100 carrying with it the plate 96 pressing against the spring 98. The relative position of the sleeve 95 with respect to the connecting rod 100 when the plate 30 bottoms against the carcass, K, is best illustrated in FIG. 14. The relative positions of 95 and 100 are again shown in FIG. 15, after the final increment of travel of the sleeve 95.

While there have been described and illustrated, specific embodiments of the invention, it will be obvious that various changes and modifications may be made therein without departing from the field of the invention which should be limited only by the scope of the appended claims.

What we claim is:

1. An electrically operated juice expressing machine comprising, in combination: a frame; an arm mounted for downward and upward travel in the frame and including a sleeve mounted for full downward travel and a connecting rod in the sleeve and movable therewith; a presser plate mounted at the upper end of the connecting rod; a juice collecting tray on the frame; a platen forming a work support for the fruit during squeezing in said juice collecting tray; a fruit receiver on the frame and swingable away from the tray; fruit cutting knives in said fruit receiver; an electric motor to drive said sleeve downwardly and upwardly through a cycle; means for energizing said motor; control means for effecting a dwell at the end of the downward stroke and de-energizing said motor automatically at the end of a cycle; and spring urged lost motion means in the arm assembly for permitting continuing travel of the sleeve after the presser plate carried by the rod has bottomed against the fruit, said latter means including a spring positioned within the sleeve and stop means engaging the upper and lower ends of the spring, the upper stop means being fixed to the sleeve and the lower stop means being fixed to the rod.

2. An electrically operated juice expressing machine comprising, in combination: a frame; an assembly mounted for vertical reciprocating movement in said frame and having a horizontal projection; a presser plate mounted upon said projection; a juice collecting tray having a delivery opening; a platen forming a work support for the fruit during squeezing and having straining means therein received in said juice collecting tray; a fruit receiver mounted between said presser plate and said tray; a plurality of radially disposed fruit-cutting knives mounted in the fruit receiver; the presser plate having slots through which the knives travel as the plate descends, the platen having a plurality of raised filler blocks adapted to be received in gaps in the flattened fruit formed by the knives; an electric motor to drive said assembly; and means for energizing said motor to drive said assembly through a downward and upward cycle.

References Cited in the file of this patent

UNITED STATES PATENTS

| | | |
|---|---|---|
| 2,168,430 | Myers | Aug. 8, 1939 |
| 2,581,294 | Read et al. | Jan. 1, 1952 |
| 2,822,030 | Pokras | Feb. 4, 1958 |
| 2,996,976 | Deems | Aug. 22, 1961 |